United States Patent [19]
Fletcher

[11] Patent Number: 4,789,195
[45] Date of Patent: Dec. 6, 1988

[54] TRUCK TOOL BOX

[76] Inventor: Nevin R. Fletcher, 11286 Roxabel St., Santa Fe Springs, Calif. 90670

[21] Appl. No.: 66,041

[22] Filed: Jun. 24, 1987

[51] Int. Cl.$^4$ .............................................. B60R 5/00
[52] U.S. Cl. .................................. 296/37.6; 296/37.1; 224/42.42
[58] Field of Search .................... 296/37.1, 37.5, 37.6, 296/37.16, 24; 224/42.42, 42.43, 273; 312/DIG. 33

[56] References Cited

U.S. PATENT DOCUMENTS

| | | | |
|---|---|---|---|
| 2,455,417 | 12/1948 | Holan et al. | 296/37.6 X |
| 2,784,027 | 3/1957 | Temp | 224/42.42 X |
| 3,068,038 | 12/1962 | Douglass, Jr. | 224/42.42 X |
| 3,326,595 | 6/1967 | Ogilvie | 296/37.6 |
| 3,664,704 | 5/1972 | Ellis | 224/42.42 X |

OTHER PUBLICATIONS

Holan Series 5100 Pamphlet of Service Truck Bodies; Nov. 1960.

Primary Examiner—Robert B. Reeves
Assistant Examiner—Russell D. Stormer
Attorney, Agent, or Firm—Herbert C. Schulze

[57] ABSTRACT

A tool and supply box suitable to mount upon the edge of a pickup truck bed wherein it is characterized particularly by extending over the upper edge of a pickup truck bed and having a side which encompasses the inner fender well of the pickup truck bed with drawers and compartments both above the bed and within a space between the fender well and the inner edge of the truck bed side. Also compartments are provided within the space between the fender well and the back of the cab of the truck.

12 Claims, 2 Drawing Sheets

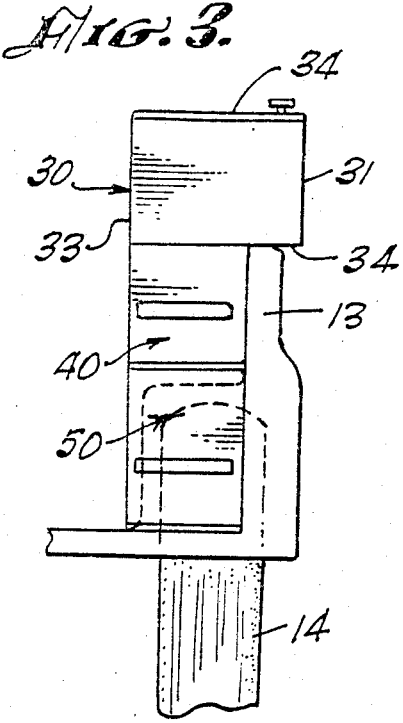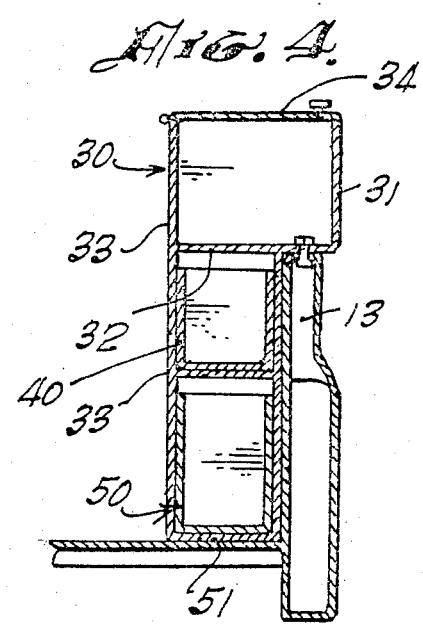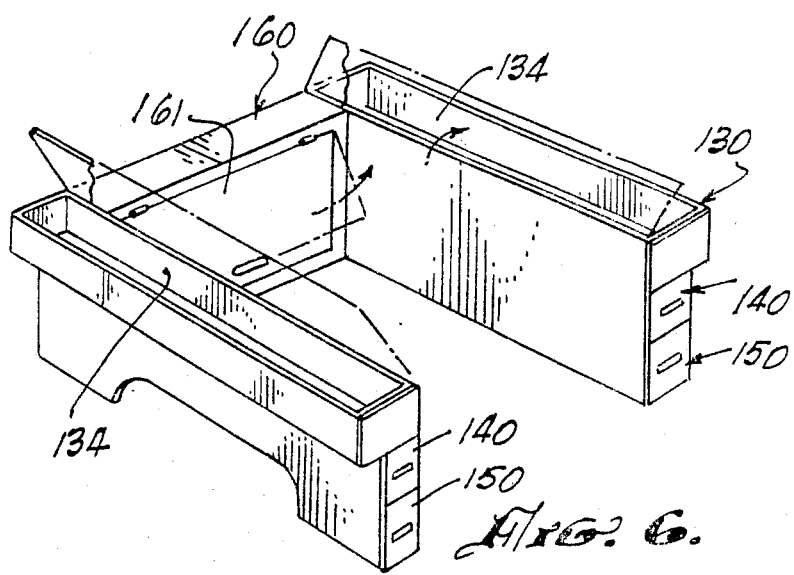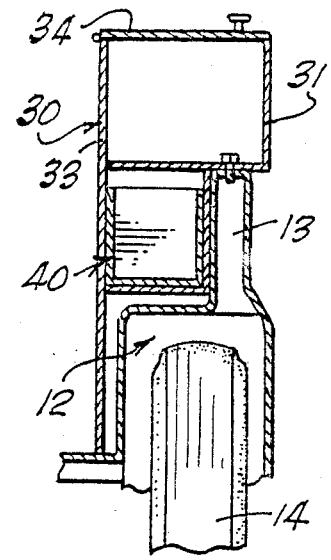

TRUCK TOOL BOX

CROSS REFERENCE TO RELATED PATENT APPLICATIONS

There are no patent applications related to this application except for design patent application for TRUCK TOOL BOX being submitted concurrently herewith.

BACKGROUND OF THE INVENTION

I Field of the Invention

This invention is in the general field of storage compartments or boxes; the invention is even more particularly directed to a storage compartment to be mounted upon the upper rail of the side of a pickup truck or the like; the invention is even more particularly directed to such a storage box wherein it is so configured as to encompass the areas between the fender well of the vehicle and the front and back of the truck body along the side rail thereof; it is further directed to such a device wherein the extra space for storage between the fender well and the side of the truck can be utilized to include sliding drawers for easy access.

II Description of the Prior Art

In pickup trucks, the only prior art known to me of boxes to store tools or other items in the bed of the truck are boxes which are configured to mount upon the upper edge of the rail of the side of a pickup truck or, in the alternative, or in connection with the foregoing a storage box which fits transversly across the bed of the pickup truck immediately behind the cab. There is nothing known to me which utilizes a box on the top of the side of a pickup truck with drawers or other compartments cooperative therewith and occupying the space between the fender well and the side of the truck.

SUMMARY OF THE INVENTION

Pickup trucks are in wide use by mechanics, plumbers, carpenters, gardeners, and numerous other persons whether engaged in a particular trade or not.

Pickup trucks are highly favored vehicles since the bed of the pickup truck provides storage room for transporting large and bulky items such as barrels, appliances, welding equipment, and the like.

Pickup trucks, however, also have the disadvantage that they generally do not have means or space to safely carry tools, such as hand tools, miscellaneous supplies, luggage, documents, and the like. In order to partially solve this problem of lack of sufficient secure storage space attempts have been made in the past to mount storage boxes on the top edge of the sides of the pickup truck, and in some cases to mount a storage box transversly immediately behind the cab of the pickup truck. Any other type of mounting, to date, has interferred with the load carrying capacity of the bed of the pickup truck.

The storage capacity provided by the boxes of the types described is limited and not necessarily subject to easy access to its interior.

I have studied this problem at length, and have conceived and developed a unique storage compartment arrangement for the beds of pickup trucks, which does not interfere with their normal carrying capacity, and yet in which the storage ability for small items and the like and the accessibility is greatly enhanced with storage capacity being capable of doubled as compared to the previously used storage boxes.

I have achieved this desired result by utilizing a storage box mounted upon the upper edge of the side of a pickup truck bed, but wherein the box extends over the fender well and a side is provided adjacent the fender well so that the otherwise unusable space between the fender well and the end of the truck and its side as well as the space between the fender well and the front of the truck and its side, as well as the space over the fender well and beneath the side of the truck bed is fully and completely utilized.

Additionally, I have provided for easy access by providing one or more storage bins over and adjacent the fender well which can be pulled out as drawers, thus avoiding the difficulty of finding things in the ordinary and heretofore known storage boxes for pickup trucks.

Additionally, the storage boxes of my design may be used in conjunction with a transverse box adjacent the cab and by their design they enhance the attractiveness of the appearance of the pickup truck bed.

It is an object of this invention to provide a storage box for a pickup truck bed which makes maximum utilization of the available space between the fender well and the side of the pickup truck;

Another object of this invention is to provide such a storage box as has been described wherein much of the storage is available through the use of pull out drawers for easy access;

Another object of this invention is to provide such a storage box which can also be used conveniently with a transversely mounted box adjacent the cab of the vehicle.

The foregoing and other objects and advantages of this invention will become apparent to those skilled in the art upon reading the description of a preferred embodiment which follows in conjunction with a review of the appended drawings.

BRIEF DESCRIPTION OF THE DRAWINGS

FIG. 3 is an end elevation in reduced scale partially broken away showing the TRUCK TOOL BOX of this invention mounted upon the side rail of the bed of a truck;

FIG. 4 is a section on 4—4 of FIG. 2;

FIG. 5 is a section on 5—5 of FIG. 2; and

FIG. 6 is an illustration of the TRUCK TOOL BOX of this invention utilizing both a left side and a right side mounted box with an intermediate additional storage compartment between them.

DESCRIPTION OF A PREFERRED EMBODIMENT

Figure 1:
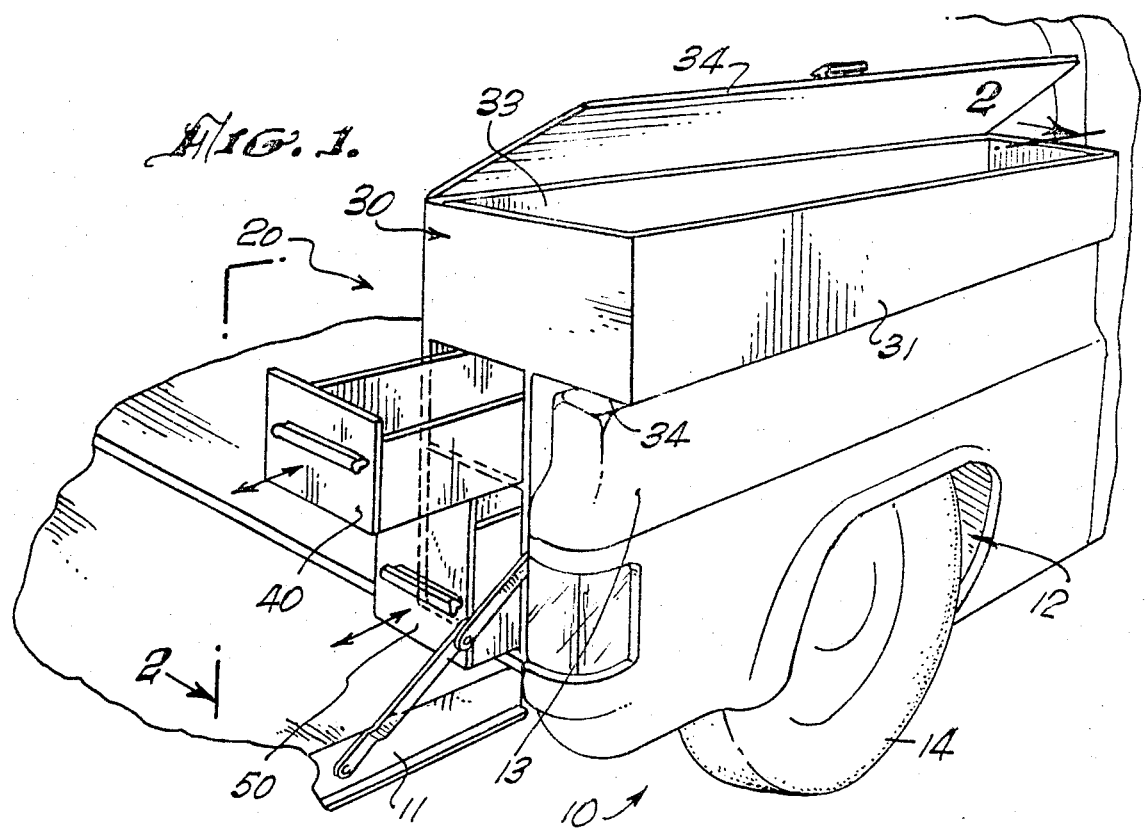
FIG. 1 is a partially broken away perspective with certain elements in phantom of a preferred embodiment of the TRUCK TOOL BOX of this invention showing it mounted upon a partially broken away schematically illustrated pickup truck bed.
Figure 2:
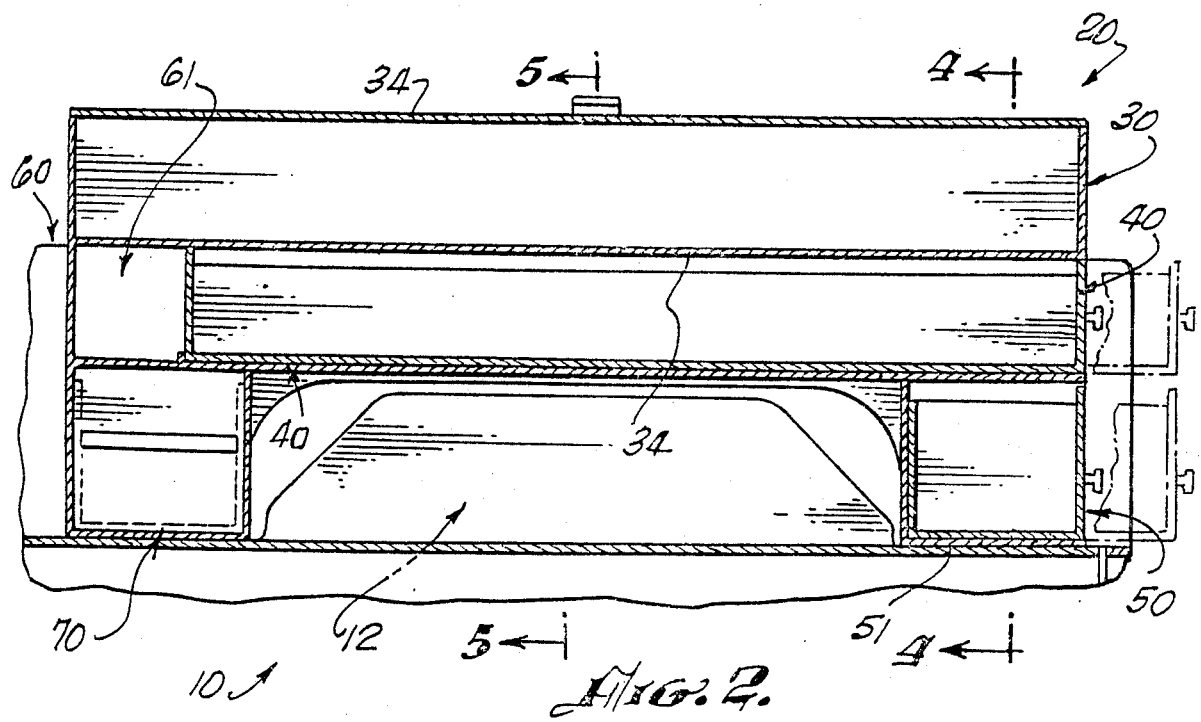
FIG. 2 is a section on 2—2 of FIG. 1.

FIG. 1 illustrates a pickup vehicle generally 10 having wheels 14 in a tirewell 12 which extends into the side rail 13 of the pickup body. Tailgate 11 is of customary construction known to those skilled in the art. The TRUCK TOOL BOX of this invention generally 20 comprises a basic portion generally 30 having an open carrying container 33 with a lid 34 and a side 31 which will be mounted upon the side 13 of the truck by the utilization of bolts, welding, or the like at 34 and such other places as may be required. 34 is generally the base of the carrying compartment 30. A drawer 40 slides above the wheel well 12 on a support member and may carry long tools or the like.

The drawer 40 may extend the entire length of the device if desired or may terminate short of the end thereof to provide an extra storage compartment 61.

A short drawer 50 will slide up to the wheel well as indicated and a storage compartment 70 will exist to the rear of the wheel well.

The opening lid 34 and the drawers 40 and 50 may be equipped with locks as desired, and the compartments 61 and 70 may also be equipped with locks and handles.

In each case, the overall unit 20 will be welded or otherwise fastened to the bed of the pickup truck in a number of places including along the lower frame member 51. Thus the drawer 50 can slide on the basic frame member 51 and the drawer 40 may slide along the intermediate member 33.

Bolts or the like as indicated at 70 may be utilized to fasten the top portion through plate 32 to the rail 13.

It will be seen that the long drawer 40 will provide a great deal of additional storage capacity as well as the shorter drawer 50 as compared to an ordinary side mounted box such as would be illustrated by the portion 30 only.

In an alternate embodiment, understanding the structure to be the same except the numerals have been preceded by a 1 in each case, there is shown to be two compartments 130, having lids 134, and which are mirror images of each other. The same applies to drawers 140 and 150. In this case, a storage compartment 160 is positioned between two side storage boxes and may have a hinged door 161 or the like for further storage.

While the embodiments of this invention shown and described are fully capable of achieving the objects and advantages desired, it is to be understood that these embodiments have been shown for purposes of illustration only and not for purposes of limitation.

I claim:

1. The combination with a pickup truck of a storage compartment mountable upon the upper edge of the side of a pickup truck and having an extension parallel with said upper edge and the bed of the said pickup truck for a distance comprising the width of a fender well within the bed of said pickup truck and having a perpendicular downwardly depending lip extending to the bed of the pickup truck and on the side of said fender well creating a lengthwise compartment between said fender well and the front of the bed of the pickup truck and the back of the bed of the pickup truck lengthwise over said fender well in such manner that the closed tailgate of pickup truck will prevent access to said compartment 2. The apparatus of claim 1 wherein a closure is provided between the back end of said lip, the floor of said storage box and the rear of said side of said pickup truck bed.

3. The apparatus of claim 2 wherein the closure has at least one opening therein, and a compartment slidable through said opening.

4. Apparatus for providing storage space in cooperation with the bed of a pickup truck comprising in combination: a box having a bottom, two sides, two ends, and an openable top, said box being adapted to be fastened to the top of a side of the bed of a pickup truck; a compartment slidably mounted on the bottom of said box in a lengthwise manner such that the closed tailgate of the pickup truck will prevent access to said compartment, and extending inwardly from the side over the bed of said pickup truck a distance equal to the distance to the inner location of a fender well extending upwardly and into the bed of said pickup truck; a shield extending from the edge of said shelf along the length thereof downwardly at a perpendicular relationship to said shelf to the bed of said truck and enclosing the fender well and the space about it between the bed of the truck, the side of the bed of the truck, the front of the bed of the truck, and the rear of the bed of the truck.

5. The apparatus of claim 4 wherein a shelf is provided within the space between the fender well, the shield, and the side of said truck suitable to accommodate a sliding compartment; a sliding compartment slidably mounted upon said shelf slidably mounted in a lengthwise direction; and means to close said sliding compartment as desired, said means being the tailgate of the pickup truck when closed.

6. The apparatus of claim 5 wherein said sliding compartment slides above the said fender well.

7. The apparatus of claim 6 wherein another sliding compartment is provided to slide beneath said sliding compartment sliding over said fender well in which said other sliding compartment slides up to and in contact with said fender well.

8. The apparatus of claim 7 wherein an openable storage compartment is mounted cooperatively with said shield in front of said fender well.

9. The apparatus of claim 8 wherein said apparatus is mounted upon the left side of the bed of the pickup truck and a mirror image thereof is mounted on the right side of the bed of said pickup truck.

10. The apparatus of claim 9 wherein there is a storage compartment mounted transversly between the two storage compartments mounted upon the sides of the bed of the pickup truck, which storage compartment is comprised of an openable top, a bottom, two sides, and two ends.

11. The apparatus of claim 10 wherein the apparatus mounted upon the left side of the bed of the pickup truck and the mirror image thereof mounted on the right side of the bed of the pickup truck extends over the upper edge of the sides of the bed of the pickup truck for a distance equivalent to a like distance by which a fender well extends outwardly from said side rail on each of the left and the right sides of the pickup truck.

12. The combination of claim 11 wherein all sliding tray members slide in a direction parallel to the normal straight forward motion of the pickup truck involved.

* * * * *